United States Patent [19]

Hasegawa

[11] Patent Number: 5,222,857
[45] Date of Patent: Jun. 29, 1993

[54] PROCESS AND APPARATUS FOR PICKING UP A LOAD FROM A STACK

[75] Inventor: Atushi Hasegawa, Nagoya, Japan

[73] Assignee: Murata Kikai Kabushiki Kaisha, Kyoto, Japan

[21] Appl. No.: 891,774

[22] Filed: Jun. 1, 1992

[30] Foreign Application Priority Data

Jun. 4, 1991 [JP] Japan .................................. 3-161007

[51] Int. Cl.$^5$ .................................. B65G 59/02
[52] U.S. Cl. .................................. 414/788.4; 414/796.7; 414/797.3; 187/17
[58] Field of Search .............. 187/17, 9 R; 414/788.4, 414/795.7, 797.3, 796.7

[56] References Cited

U.S. PATENT DOCUMENTS

| | | | |
|---|---|---|---|
| 3,263,829 | 8/1966 | Verrinder et al. | 414/797.3 X |
| 4,047,622 | 9/1977 | Blessing | 414/796.7 |
| 4,557,656 | 12/1985 | Ouellette | 414/796.7 X |
| 4,632,621 | 12/1986 | Cable | 414/796.7 |
| 4,954,760 | 9/1990 | Futch et al. | 414/796.7 X |

FOREIGN PATENT DOCUMENTS

| | | | |
|---|---|---|---|
| 0071029 | 5/1980 | Japan | 414/796.7 |
| 1291254 | 2/1987 | U.S.S.R. | 414/797.3 |

*Primary Examiner*—D. Glenn Dayoan
*Attorney, Agent, or Firm*—Spensley, Horn, Jubas & Lubitz

[57] ABSTRACT

A process for picking up a load from a stack which includes the steps of calculating a height by which a pallet carrying a stack of layers of a load thereon will have to be raised to enable the upper end of the stack to reach a set level of height for detection, from input data on the height of each of the layers and the number of the layers; raising the pallet until the upper end is detected at the level; calculating the real height of each of the layers from the real height by which the pallet has been raised, and the number of the layers; raising the pallet incrementally by a height corresponding to a difference between the calculated real height and a preselected constant, and picking up the load from the uppermost of the layers by a table reciprocating at a fixed height; the incremental raising of the pallet and the picking up being thereafter repeated.

5 Claims, 6 Drawing Sheets

PROCESS AND APPARATUS FOR PICKING UP A LOAD FROM A STACK

BACKGROUND OF THE INVENTION

1. Field of the Invention

This invention relates to a process for picking up a load from a stack in a load handling apparatus, or the like by which the load stacked on a pallet, or the like is picked up from a layer or layers of its stack, and transferred to another place.

2. Prior Art

It is sometimes necessary that a load stacked in layers, for example, on a pallet be transferred layer by layer onto another pallet.

In a factory producing canned drinks, for example, it is usual to stack corrugated cardboard boxes containing canned drinks on different pallets used for different kinds of drinks, pick up a layer or layers of boxes from one or more of those pallets, and stack them again on different pallets classified by customers.

Figure 6A:
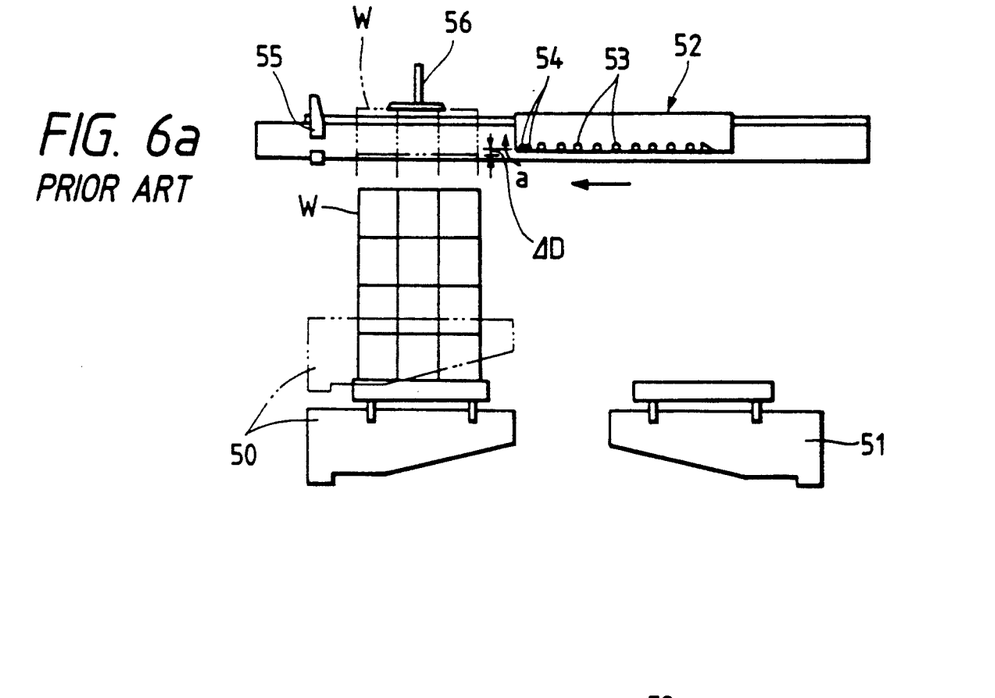
FIGS. 6a and 6b are views illustrating the operation of the known load handling apparatus.
Figure 6B:
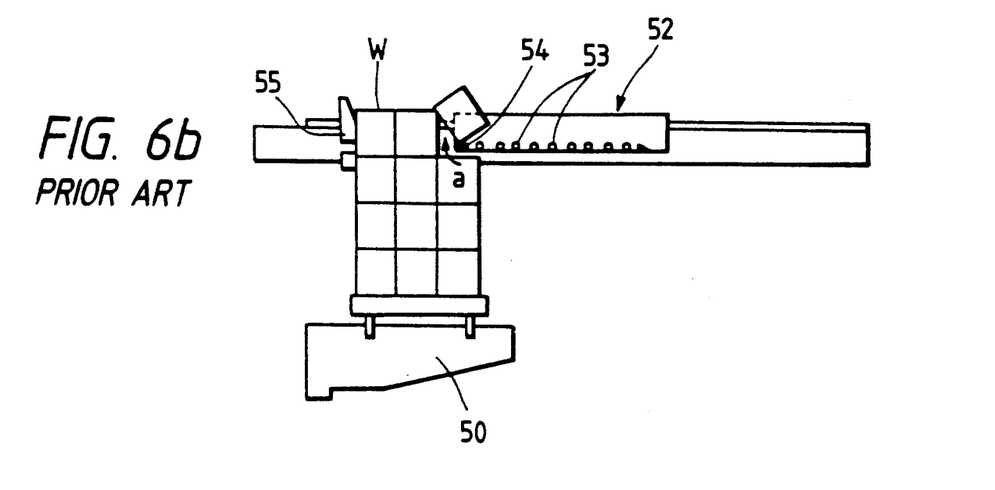

An apparatus which has been proposed for performing such load handling efficiently is shown in FIG. 6.

The apparatus comprises an unloading lift 50 carrying a load W stacked in layers, a loading lift 51 juxtaposed to the lift 50, and a table 52 reciprocating above and between the lifts 50 and 51. The reciprocating table 52 is provided with a multiplicity of carriage rollers 53 and top carriage rollers 54.

The unloading lift 50 is first raised until the uppermost layer of the load W on the lift 50 is detected by a load height detector 56, as shown by chain lines in FIG. 6a, whereupon the lift 50 stops. Then, the reciprocating table 52 is advanced, while the top carriage rollers 54 are rotated upwardly as shown by an arrow a. The top carriage rollers 54 contact the adjacent side of the load W and pick it up friction for transfer onto the carriage rollers 53. The load W to be picked up is supported by a stopper 55 so as to stay in an orderly position, as shown in FIG. 6b.

The height of the load height detector 56 is so set that the bottom of the uppermost layer of the load W may be at a level which is lower than the top carriage rollers 54 by a certain height $\Delta D$. If the height $\Delta D$ is too large, the top carriage rollers 54 fail to perform a proper picking action, and if it is too small, the top carriage rollers 54 engage the second heighest layer of the load W and fail to perform any proper picking action. It is, therefore, necessary for the height $\Delta D$ to be set accurately.

The apparatus as hereinabove described cannot, however, recognize any erroneous supply by the lift 50 of pieces of a load W which are differently sized from the intended ones. Therefore, it starts a picking operation, even though the difference in height between the bottom of the uppermost layer of the load W and the top carriage rollers 54 may greatly differ from the set height $\Delta D$. This results in the failure of the apparatus to pick up the load and even the occurrence of damage to the load W or the apparatus.

Even if the load W may be an intended one, the apparatus cannot always be expected to perform a smooth picking up operation, since the individual components of the load W are likely to differ from one another in real height, particularly if they are corrugated cardboard boxes.

OBJECT AND SUMMARY OF THE INVENTION

It is an object of this invention to provide a process for picking up a load from a stack which makes it possible to distinguish correctly a dimensionally wrong load from an intended load, and enables the smooth picking up of the intended load, even if its components may vary in dimensions.

A process for picking up a load from a stack of this invention comprises the steps of calculating a height by which a pallet carrying a stack of layers of a load thereon will have to be raised to enable the upper end of said stack to reach a set level of height for detection, from input data on the height of each of said layers and the number of said layers; raising said pallet until said upper end is detected at said level; calculating the real height of each of said layers from the real height by which said pallet has been raised, and said number of said layers; raising said pallet incrementally by a height corresponding to a difference between said calculated real height and a preselected constant; and picking up said load from the uppermost of said layers by a table reciprocating at a fixed height; said incremental raising of said pallet and said picking up being thereafter repeated.

DETAILED DESCRIPTION OF PREFERRED EMBODIMENTS

Figure 1:
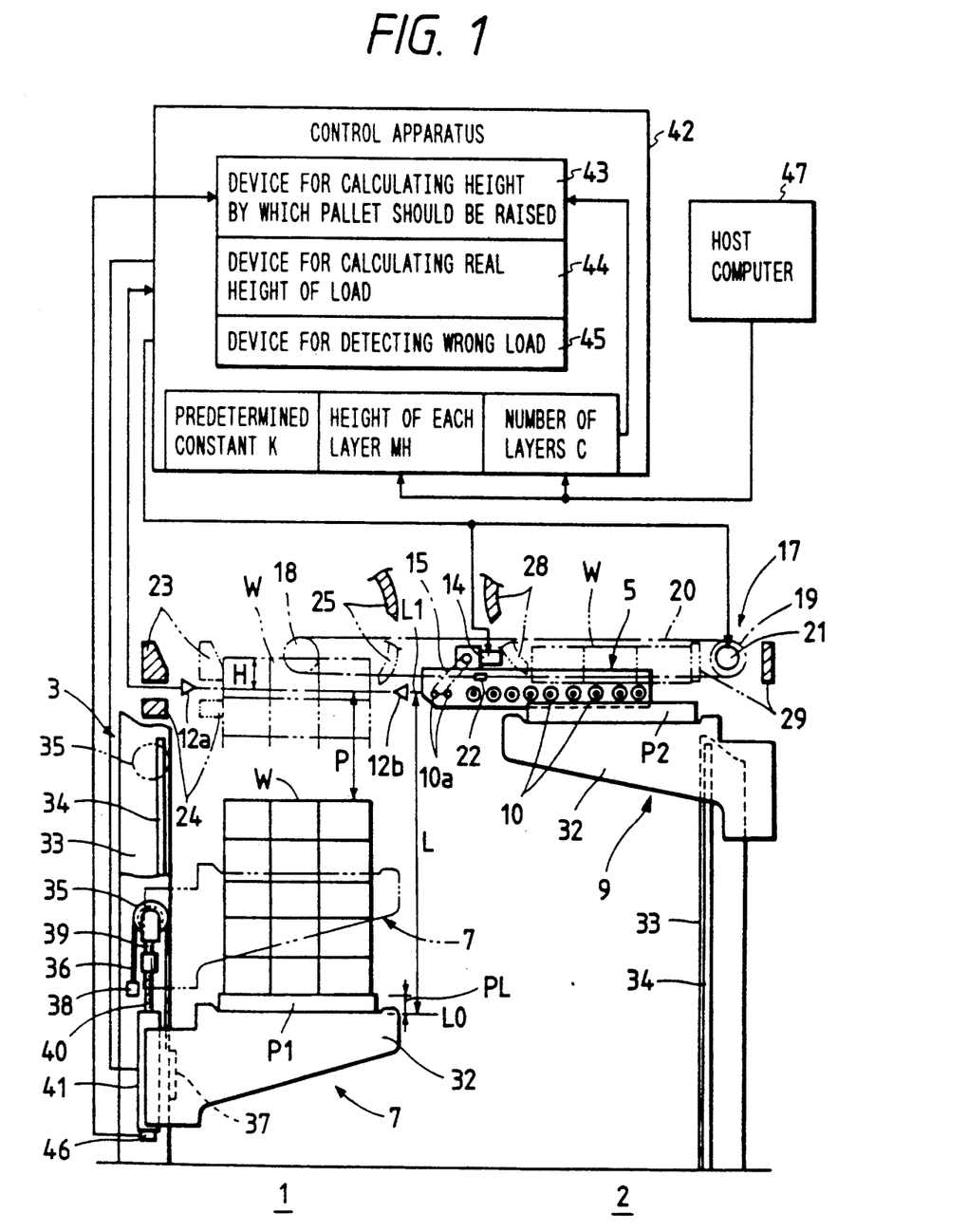
FIG. 1 is a diagrammatic view of the load handling apparatus which can be employed for carrying out the load-picking process embodying this invention.

The invention will be described with reference to FIG. 1 showing an embodiment thereof.

The process of this invention comprises a number of steps as will hereunder be described. A height P by which a pallet P1 carrying a stack of layers of a load W thereon will have to be raised to enable the upper end of the stack to reach a set level L1 of height for detection is first calculated from input data on the height MH of each layer of the load W and the number of layers C. The pallet P1 is raised until the upper end of the stack is detected at the set level L1. The real height H of each layer is calculated from the real height by which the pallet has been raised, and the number of layers C. The pallet P1 is raised incrementally by a height corresponding to a difference between the calculated real height H and a preselected constant K. The load W is picked up from its uppermost layer by a table 5 reciprocating at a fixed height. The raising of the pallet P1 by the calculated real height H and the picking up operation of the table 5 are thereafter repeated.

According to the process of this invention, the pallet P1 is raised until the upper end of the load thereon is detected at the set level L1, and the real height H of each layer of the load is calculated from the input data on the real height by which the pallet has been raised, and the number of the layers C. The real height H as calculated is used for controlling the subsequent raising of the pallet L1. Therefore, the pallet P1 can be raised to an adequate level of height to enable the reciprocating table 5 to pick up the load smoothly, even if the real height H of each layer of the load may somewhat differ from the input data on the height MH thereof.

It is possible to recognize a wrong load during the step for the calculation of the real height H of each layer of the load.

For example, a wrong load can be discovered if the real height by which the pallet L1 has been raised until the upper end of the load is detected, is compared with the intended height P. A wrong load can also be detected if the real height H as calculated is compared with the input data on the height MH of each layer of the intended load. A double check of the load can, therefore, be made.

An embodiment of this invention will now be described with reference to FIGS. 1 to 5.

Figure 2:
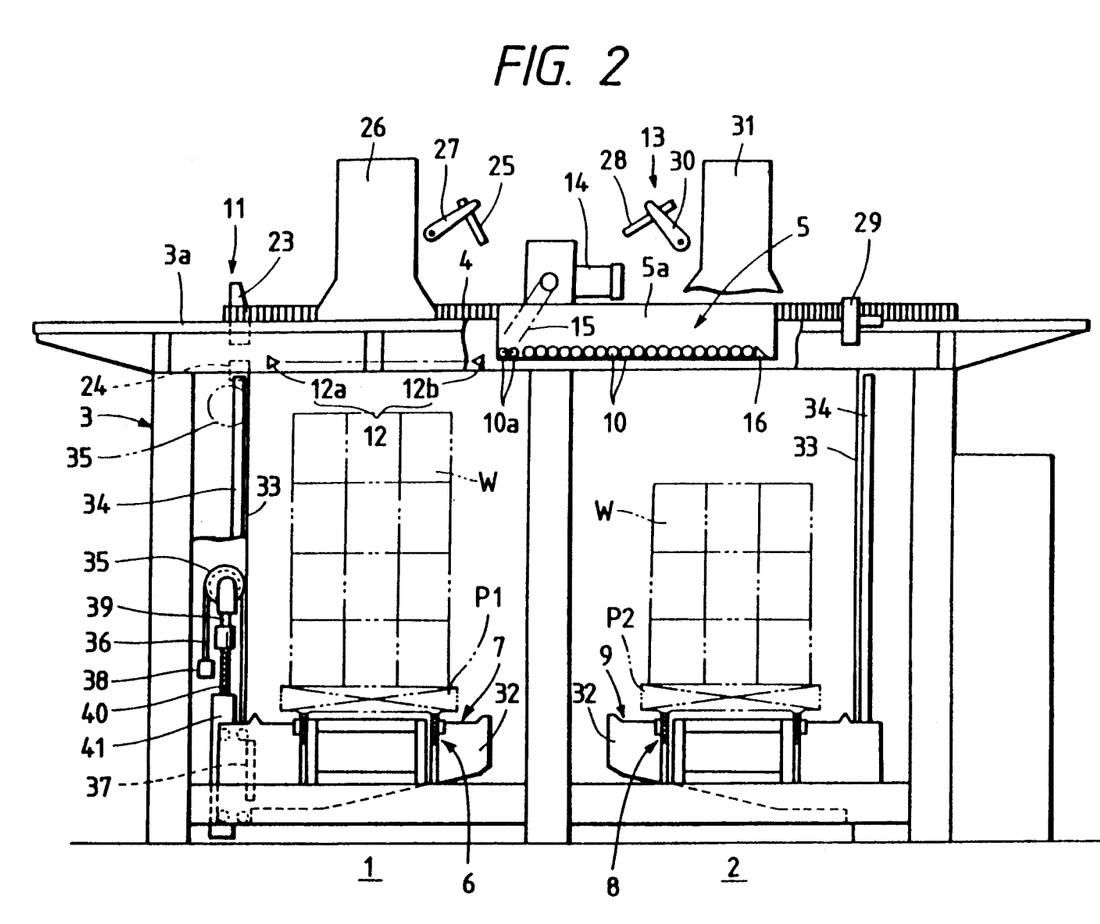
FIG. 2 is a front elevational view, partly in section, of the whole load handling apparatus.

FIG. 2 is a front elevational view, partly in section, of the whole of a load handling apparatus which can be employed for carrying out a stacked load picking up process embodying this invention. It includes an unloading zone 1, a loading zone 2 juxtaposed to it, and a table 5 which can reciprocate above and between the zones 1 and 2 along a rail 4 on a main framework 3.

The unloading zone 1 is provided with a conveyor 6 for charging a pallet P1 carrying a stack of layers of a load W, and a lift 7 for lifting the pallet P1 to raise the load W layer by layer to a level of height corresponding to that of the reciprocating table 5.

The loading zone 2 is provided with a lift 9 carrying an empty pallet P2 and adapted to move down upon transfer of each layer of the load W from the reciprocating table 5 onto the pallet P2, and a conveyor 8 for discharging the pallet P2.

The reciprocating table 5 includes a multiplicity of carriage rollers 10 constituting a roller conveyor, and is adapted to pick up the load W layer by layer in the unloading zone 1 and transfer it to the loading zone 2.

The unloading zone 1 is provided at its top with a load aligning device 11 which assists the reciprocating table 5 in picking up the load, and a load height detector 12 which may, for example, comprise a photointerrupter consisting of a combination of light-emitting diode 12a and a light-receiving element 12b. The loading zone 2 is provided at its top with a load aligning device 13 which assists the unloading of the reciprocating table 5 and aligns the load W for its ejection.

The carriage rollers 10 are connected between a pair of side frames 5a forming the reciprocating table 5. Each side frame 5a is provided with gear-like wheels (not shown) which engage the rail 4 in the form of a rack attached to the top frame 3a of the main framework 3 and enable the side frame 5a to move along the rail 4. The carriage rollers 10 include two top carriage rollers 10a located at the end of the table 5 close to the unloading zone 1 and adapted for rotation by a motor 14 and a drive chain 15, while the other carriage rollers 10 are freely rotatable.

Each top carriage roller 10a has an outer surface coated with rubber, such as urethane or vinyl rubber, to produce a large friction force. An inclined sliding plate 16 is connected between the side frames 5a at the end of the table 5 close to the loading zone 2 for allowing the load W to slide down.

A device 17 for driving the reciprocating table 5 for movement in either direction comprises an endless chain 20 extending between sprockets 18 and 19 on the main framework 3 and connected to the table 5 by a connecting member 22, and a motor 21 for driving the sprockets 18 and 19 for rotation in either direction, as shown in FIG. 1.

The aligning device 11 for the load to be picked up comprises an upper stopper 23 and a lower stopper 24 which are located at one end of the main framework 3, and an aligning stopper 25 facing the upper stopper 23. The upper and lower stoppers 23 and 24 are engageable with the uppermost and second highest layers, respectively, of the load W, and are each supported on the main framework 3 movably to and away from the load by a cylinder(not shown). The aligning stopper 25 is fixed to a rotatable arm 27 connected to a supporting frame 26, and the arm 27 is rotatable in either direction by a cylinder(not shown) to advance and retract the aligning stopper 25.

The aligning device 13 for the load to be ejected comprises an ejecting stopper 28 located above a path for the travel of the reciprocating table 5, a front stopper 29 facing the ejecting stopper 28, and a pair of mutually facing side stoppers(not shown). The ejecting stopper 28 is vertically rotatably supported on a supporting frame 31 by a rotatable arm 30 and is rotatable by a cylinder(not shown) between its advanced and retracted positions. The front stopper 29 is supported on the main framework 3 movable to and away from the load by a cylinder not shown.

Each of the lifts 7 and 9 comprises a pair of parallel arms 32 supported vertically movably along vertical rails 34 on guide posts 33, and suspended from suspending ropes 36 extending about movable pulleys 35. The suspending ropes 36 are fastened at one end to a plate 37 connecting the arms 32 to each other at the base ends thereof, while the other ends of the ropes are fastened to the guide posts 33 by fastening members 38. The pulleys 35 are attached to the opposite sides, respectively, of the T-shaped head of a lifting rod 39 and are vertically movable by a feed screw mechanism 40 which is driven by a lifting motor 41.

FIG. 1 shows a control system. A control apparatus 42 is used for controlling the operation of the load handling apparatus as a whole, includes a device 43 for calculating the height by which a pallel will have to be raised, a device 44 for calculating the real height of each layer of a load and a device 45 for detecting a wrong load, and may, for example, comprise a computer.

The device 43 has the function of calculating the height P by which the pallet P1 on the lift 7 will have to be raised to enable the upper end of the load W thereon to reach the set level of height for detection, i.e. the level L1 of height of the load height detector 12, from the input data on the height MH of each layer of the load W and the number C of the layers of the load which are given by a host computer 47. The host computer 47 is used for controlling the whole of, for example, a material distributing system including the load handling apparatus.

The device 44 has the function of calculating the real height of each layer of the load from the input data on the real height by which the pallet L1 has been raised before the upper end of the load W reaches the set level L1, and the number of the layers C. The real height by which the pallet L1 has been raised can be determined by putting into the control apparatus 42 an output signal of the load height detector 12 and an output signal of a lift position detector 46, such as a rotary encoder, which is connected to the lifting motor 41.

Figure 3A:
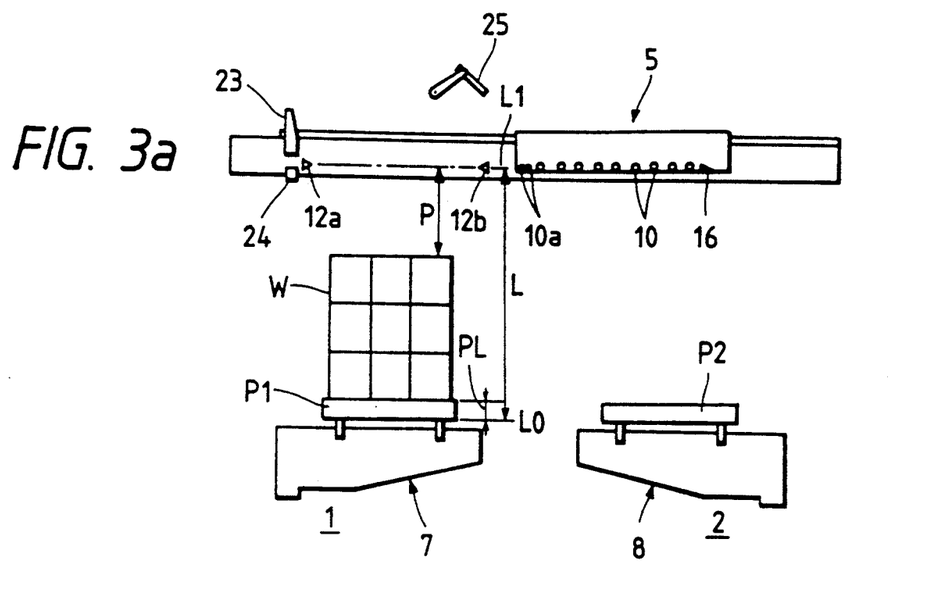
FIGS. 3a and 3b are views illustrating the operation of the load handling apparatus.
Figure 3B:
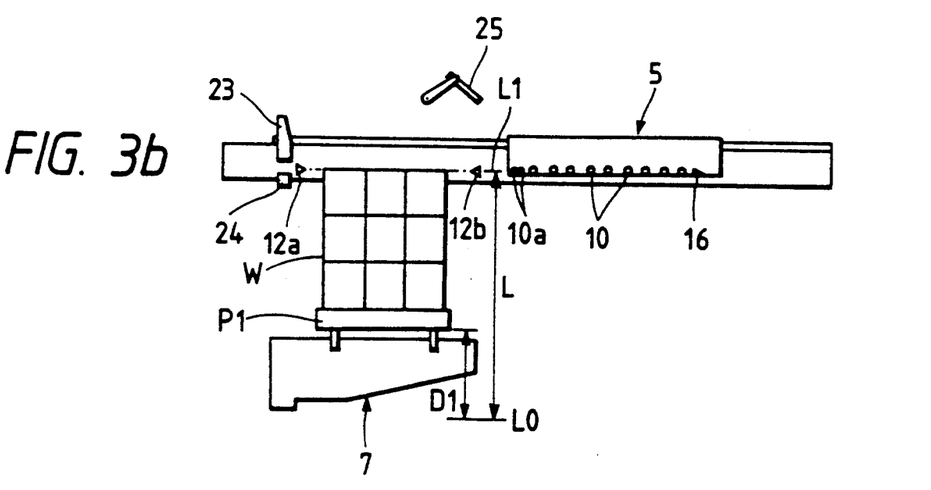
Figure 4A:
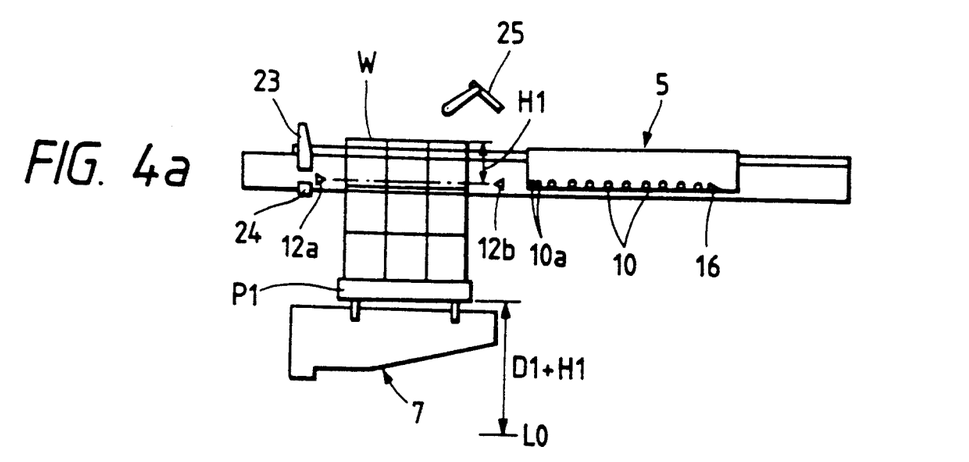
FIGS. 4a, 4b and 4c are views illustrating the operation of the load handling apparatus.
Figure 4B:
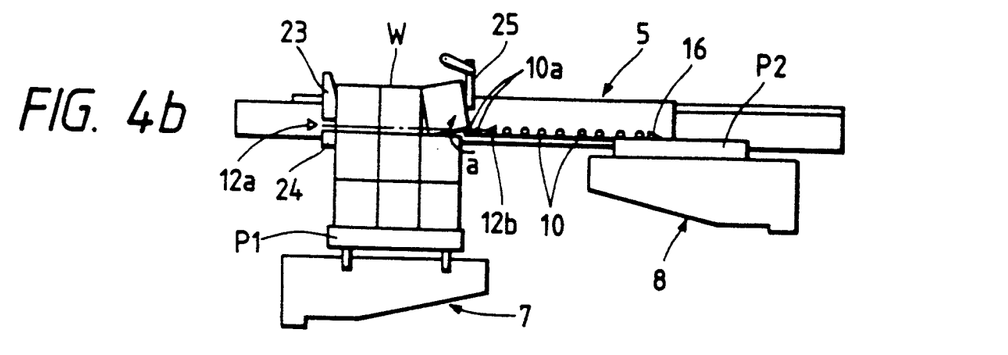
Figure 4C:
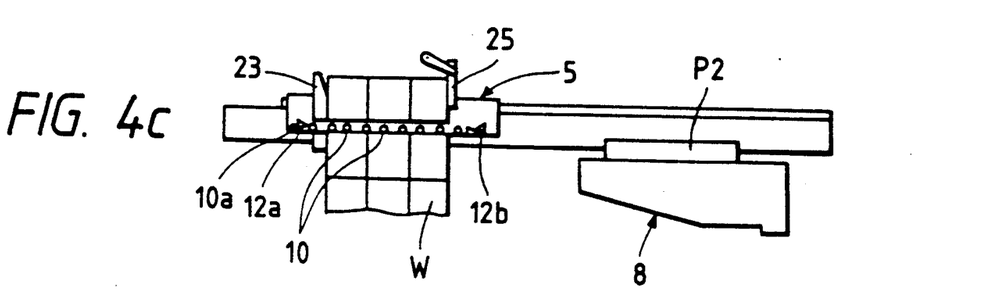
Figure 5:
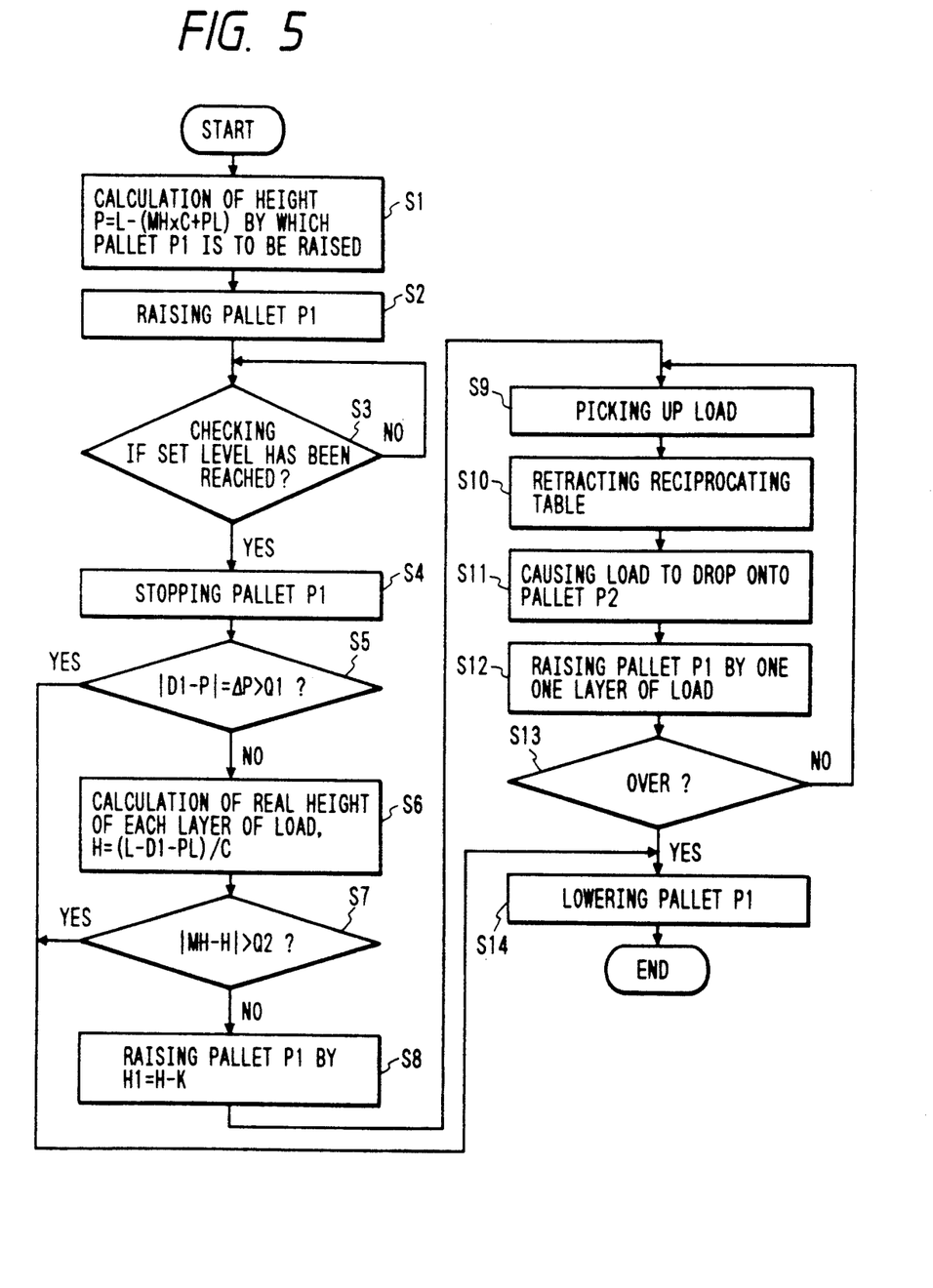
FIG. 5 is a flow chart showing the operation of the load handling apparatus.

The operation of the load handling apparatus as hereinabove described will be explained with reference to FIGS. 3 and 4 illustrating its operation and FIG. 5 which is a flow chart.

In FIG. 3a, the load W on the pallet P1 in the unloading zone 1 may, for example, consist of corrugated cardboard boxes containing canned or bottled drinks. The pallet P2 in the loading zone 2 may, for example, be one of pallets used for preparing shipments for different customers.

Calculation is made of the height P by which the pallet P1 will have to be raised to enable the upper end of the load W to reach the set level L1 (Step S1), before the lift 7 is raised. This calculation is made by the device 43 using the input data on the height MH of each layer of the load W on the pallet P1 and the number C of the layers from the host computer 47 in accordance with the equation:

$$P = L - (MH \times C + PL)$$

where L stands for the distance from a base level L0 to the set level L1 of height for detection, and PL stands for the height or thickness of the pallet P1.

Then, the lift 7 is raised to lift the pallet P1 from the base level L0 (Step S2), and when the upper end of the uppermost layer of the load W has reached the set level L1, i.e. the level of height of the load height detector 12, the load height detector 12 inputs an output signal to the control apparatus 42 (Step S3). In response to that signal, the control apparatus 42 gives a stop signal to the lifting motor 41 to stop the raising of the lift 7 (Step S4).

The real height D1 by which the pallet P1 has been raised is determined by an output signal of the lift position detector 46 and compared with the calculated height P in the wrong load detecting device 45, and a decision is made as to whether the load W is right, or is wrong if the difference ΔP between D1 and P exceeds a set value Q1 (Step S5). If the decision indicates that the load is wrong, the process skips to Step S14 and the operation of the load handling apparatus is terminated.

If the decision made in Step S5 indicates that the load is right, the real load height calculating device 44 calculates the real height H of each layer of the load using the real height D1 as calculated above and the input data on the number C of the layers in accordance with the equation:

$$H = (L - D1 - PL)/C \text{ (Step S6)}.$$

The wrong load detecting device 45 compares the real height H as calculated and the input data on the height MH, and makes a decision again as to whether the load W is right or not (Step S7). If the difference ΔH between H and MH exceeds a set value Q2, the decision is that the load W is wrong. If such is the case, the process skips to Step S14 and the operation of the load handling apparatus is terminated. Thus, a double check of the load is made.

If the decision made in Step S7 confirms that the load is right, the pallet P1 is raised by the height corresponding to the difference H1 between the calculated height H and the constant K, as shown in FIG. 4a (Step S8). In other words, the pallet P1 is raised to raise the load W so that the bottom of its uppermost layer may be at a level of height which is lower by the value of K than the level of height of the top carriage rollers 10a in the reciprocating table 5.

Then, the upper and lower stoppers 23 and 24 are advanced, while the aligning stopper 25 is rotated downwardly, and the reciprocating table 5 travels from the loading zone 2 to the unloading zone 1, while the top carriage rollers 10a are rotated clockwise, as shown in FIG. 4b. The top carriage rollers 10a abut on the adjacent side of the uppermost layer of the load W, and the load W is held between the upper stopper 23 and the top carriage rollers 10a and is picked up by the friction force of the top carriage rollers 10a rotating clockwise (as shown by the arrow a) (Step S9).

As the reciprocating table 5 further travels, the load W is transferred onto the carriage rollers 10, as shown in FIG. 4c. As the pallet P1 is raised to bring the load W up to an appropriate level of height conforming to that of the top carriage rollers 10a as a result of calculation of the real height H of each layer of the load as hereinabove described, the reciprocating table 5 performs a smooth load picking-up operation, even if the real height H may differ from the inputted height MH of each layer of the load.

In the meantime, the empty pallet P2 in the loading zone 2 is raised by the lift 9 to wait at a level of height close to the bottom of the reciprocating table 5.

When the whole of each layer of the load W has been transferred onto the reciprocating table 5, the aligning stopper 25 is rotated upwardly, and the reciprocating table 5 travels back to convey the load W to the loading zone 2 (Step S10).

When the reciprocating table 5 has moved back to an appropriate position in the loading zone 2, it is detected by an appropriate detector (not shown), and the ejecting stopper 28 is rotated downwardly. The reciprocating table 5 is, then, moved again toward the unloading zone 1 below the ejecting stopper 28, whereupon the load W is held by the ejecting stopper 28, and caused to drop from the table 5 onto the pallet P2 (Step S11).

While the reciprocating table 5 stays in the loading zone 2, the lift 7 in the unloading zone 1 is raised by the real height H as calculated in Step S6, and the upper and lower stoppers 23 and 24 and the aligning stopper 25 wait in their advanced positions again (Step S12).

Then, a decision is made based on the input data from the host computer 43, etc. as to whether the load handling work is to be finished, or not (Step S13). If the decision calls for the continuation of the work, the process returns to Step S9 and is repeated. If the decision confirms that the work is over, the lift 7 is lowered to the base level L0 and the load handling operation is completed.

According to the process of this invention, the reciprocating table 5 is reciprocated to pick up the desired number of layers of the load W from the pallet P1 in the unloading zone 1 and stack them again on the pallet P2 in the loading zone 2.

It is possible to pick up the load smoothly from the pallet P1, since the pallet P1 is raised to an appropriate level of height conforming to that of the reciprocating table 5, as hereinabove stated. Moreover, a double check of the load ensures that no wrong load-handling work take place.

According to the load picking-up process of this invention, the real height of each layer of the load is calculated from the real height by which the pallet has been raised to enable the upper end of the load to reach the set level for detection and the input data on the number of the layers of the load, and is utilized for controlling the height by which the pallet is thereafter raised. Therefore, it is possible to raise the pallet to an appropriate level of height conforming to that of the reciprocating table and thereby pick up the load smoothly, even if the real height of each layer of the load may somewhat differ from the input data on the height thereof.

It is also beneficial to check the load, if required to discover a wrong load, during the step for the calculation of the real height of each layer of the load.

What is claimed is:

1. A process for raising a pallet carrying a stack of layers of a load thereon which comprises the steps of calculating a height by which a pallet carrying a stack of layers of a load thereon will have to be raised to enable the upper end of said stack to reach a set level of height for detection, from input data on the height of each of said layers and the number of said layers; raising said pallet until said upper end is detected at said level; calculating the real height of each of said layers from the real height by which said pallet has been raised, and said number of said layers; and raising said pallet incrementally by a height corresponding to a difference between said calculated real height and a preselected constant.

2. A process for picking up a load from a stack which comprises the steps of calculating a height by which a pallet carrying a stack of layers of a load thereon will have to be raised to enable the upper end of said stack to reach a set level of height for detection, from input data on the height of each of said layers and the number of said layers; raising said pallet until said upper end is detected at said level; calculating the real height of each of said layers from the real height by which said pallet has been raised, and said number of said layers; raising said pallet incrementally by a height corresponding to a difference between said calculated real height and a preselected constant; and picking up said load from the uppermost of said layers by a table reciprocating at a fixed height; said incremental raising of said pallet and said picking up being thereafter repeated.

3. An apparatus for picking up a load from a stack which comprises an unloading zone, a loading zone juxtaposed to it, a table which reciprocates between the unloading zone and the loading zone along a rail, and a control apparatus for controlling an operation of the whole apparatus, said control apparatus including a device for calculating the height by which a pallet has to be raised, a device for calculating the real height of each layer of a load and a device for detecting a wrong load.

4. An apparatus for picking up a load as claimed in claim 3, wherein said unloading zone is provided with a conveyor for charging a pallet carrying a stack of layers of a load, a first lift for lifting the pallet to raise the load layer by layer to a level of height corresponding to that of the reciprocating table, a first load aligning device which asists the reciprocating table in picking up the load, a load height detector, and a lift position detector mounted on the first lift.

5. An apparatus for picking a load as claimed in claim 3, wherein said loading zone is provided with a second lift carrying an empty pallet and adapted to move down upon transfer of each layer of the load from the reciprocating table onto the pallet, a conveyor for discharging the pallet, and a second load aligning device which assists the unloading of the reciprocating table and aligns the load for its ejection.

* * * * *